(12) United States Patent
Dawson

(10) Patent No.: US 11,321,398 B2
(45) Date of Patent: May 3, 2022

(54) DISCRETIZATION FOR BIG DATA ANALYTICS

(71) Applicant: Sony Corporation, Tokyo (JP)

(72) Inventor: Thomas Dawson, Escondido, CA (US)

(73) Assignee: Sony Group Corporation, Tokyo (JP)

( * ) Notice: Subject to any disclaimer, the term of this patent is extended or adjusted under 35 U.S.C. 154(b) by 374 days.

(21) Appl. No.: 16/262,470

(22) Filed: Jan. 30, 2019

(65) Prior Publication Data

US 2020/0242162 A1    Jul. 30, 2020

(51) Int. Cl.
    *G06F 16/906*    (2019.01)
    *G06F 16/9035*    (2019.01)
    *G06F 16/11*    (2019.01)
    *G06F 16/901*    (2019.01)

(52) U.S. Cl.
    CPC .......... *G06F 16/906* (2019.01); *G06F 16/122* (2019.01); *G06F 16/9017* (2019.01); *G06F 16/9035* (2019.01)

(58) Field of Classification Search
    CPC ............... G06F 16/906; G06F 16/9035; G06F 16/9017; G06F 16/122
    USPC ....................................................... 707/705
    See application file for complete search history.

(56) References Cited

U.S. PATENT DOCUMENTS

| | | | |
|---|---|---|---|
| 6,618,500 B1 * | 9/2003 | Dawson ................ | G06T 11/001 345/604 |
| 7,451,065 B2 | 11/2008 | Pednault | |
| 8,363,961 B1 * | 1/2013 | Avidan ................ | G06K 9/6218 382/225 |
| 10,546,043 B1 * | 1/2020 | Balu ..................... | H04W 4/025 |

OTHER PUBLICATIONS

N. Karthikeyani, Visalakshi, et al., "Distributed Data Clustering: A Comparative Analysis", Foundations of Comput. Intel., vol. 6, SCI 206, Springer-Verlag, Berlin, Germany, © 2009, pp. 371-397.*
Pelleg, Dan, et al., "X-means: Extending K-means with Efficient Estimation of the Number of Clusters", Proc. of the 17th Int'l Conf. on Machine Learning, Morgan Kaufmann, © 2000, pp. 727-734.*
Han, Jiawei, et al., Data Mining: Concepts and Techniques, Morgan Kaufman Publishers, San Francisco, CA, © 2001, pp. 348-354, 384-385 and 388-389.*

(Continued)

*Primary Examiner* — Robert Stevens
(74) *Attorney, Agent, or Firm* — Trellis IP Law Group, PC

(57) ABSTRACT

Implementations generally relate to discretization for big data analytics. In some implementations, a method includes receiving a plurality of data points. The method further includes determining a plurality of data centroids, where each data centroid of the plurality of data centroids is predetermined. The method further includes determining a plurality of data regions for the plurality of data centroids, where each data region of the plurality of data regions is associated with a respective data centroid of the plurality of data centroids. The method further includes generating a plurality of data region boundaries for the plurality of data regions based at least in part on one or more data points of the plurality of data points, where each data region boundary of the plurality data region boundaries is associated with a respective data region of the plurality of data regions.

20 Claims, 13 Drawing Sheets

(56) References Cited

OTHER PUBLICATIONS

"Centroid", Wikipedia, downloaded from: https://en.wikipedia.org/wiki/Centroid, Mar. 10, 2021, pp. 1-8.*
"List of centroids", Wikipedia, downloaded from: https://en.wikipedia.org/wiki/List_of_centroids, Mar. 10, 2021, pp. 1-5.*
Yu, Hwanjo, et al., "Classifying Large Data Sets Using SVMs with Hierarchical Clusters", SIGKDD '03, Washington, DC, Aug. 24-27, 2003, pp. 306-315.*
Sajana, T., et al., "Survey on Clustering Techniques for Big Data Mining", Indian Journal of Science and Technology, vol. 9, Issue 3, Jan. 2016, pp. 1-12.*
Bangui, Hind, et al., "Exploring Big Data Clustering Algorithms for Internet of Things Applications", IoTBDS 2018 Proceedings, © 2018 SCITEPRESS, pp. 269-276.*
Garcia, Salvador, et al. "Big data preprocessing: methods and prospects": https://bdataanalytics.biomedcentral.com/articles/10.1186/s41044-016-0014-0; Nov. 15, 2016, 22 pages.

* cited by examiner

DISCRETIZATION FOR BIG DATA ANALYTICS

BACKGROUND

It is often desirable to reduce the total amount of data in a process known as data discretization. In conventional solutions, each data point is assigned to the cluster of data points that have the closest data centroid. There are typically some discretization errors when continuous data is discretized. Various conventional solutions attempt to address these errors by optimizing the identification of data centroid locations for data discretization. The boundaries generated around each data centroid are typically orthogonal to the coordinate system axis, which is rarely optimal in that data points may be assigned to an inappropriate cluster.

SUMMARY

Implementations generally relate to big data analytics. In some implementations, a system includes one or more processors, and includes logic encoded in one or more non-transitory computer-readable storage media for execution by the one or more processors. When executed, the logic is operable to cause the one or more processors to perform operations including receiving a plurality of data points; determining a plurality of data centroids, where each data centroid of the plurality of data centroids is predetermined; determining a plurality of data regions for the plurality of data centroids, where each data region of the plurality of data regions is associated with a respective data centroid of the plurality of data centroids; and generating a plurality of data region boundaries for the plurality of data regions based at least in part on one or more data points of the plurality of data points, where each data region boundary of the plurality data region boundaries is associated with a respective data region of the plurality of data regions.

With further regard to the system, in some implementations, the data regions are discrete data regions. In some implementations, the generating of the plurality of data region boundaries is based at least in part on minimal surface theory. In some implementations, to generate the plurality of data region boundaries, the logic when executed is further operable to cause the one or more processors to perform operations including increasing a size of one or more of the data region boundaries based at least in part on one or more data points of the plurality of data points. In some implementations, each data region boundary between each pair of data regions is non-orthogonal to an axis of measurement. In some implementations, the logic when executed is further operable to cause the one or more processors to perform operations including generating a lookup table that maps received data points to data regions based on the data region boundaries. In some implementations, the logic when executed is further operable to cause the one or more processors to perform operations including assigning each received data point to one of the data regions based on a lookup table, where the lookup table maps received data points to respective data regions based on the data region boundaries.

In some embodiments, a non-transitory computer-readable storage medium with program instructions thereon is provided. When executed by one or more processors, the instructions are operable to cause the one or more processors to perform operations including receiving a plurality of data points; determining a plurality of data centroids, where each data centroid of the plurality of data centroids is predetermined; determining a plurality of data regions for the plurality of data centroids, where each data region of the plurality of data regions is associated with a respective data centroid of the plurality of data centroids; and generating a plurality of data region boundaries for the plurality of data regions based at least in part on one or more data points of the plurality of data points, where each data region boundary of the plurality data region boundaries is associated with a respective data region of the plurality of data regions.

With further regard to the computer-readable storage medium, in some implementations, the data regions are discrete data regions. In some implementations, the generating of the plurality of data region boundaries is based at least in part on minimal surface theory. In some implementations, to generate the plurality of data region boundaries, the instructions when executed are further operable to cause the one or more processors to perform operations including increasing a size of one or more of the data region boundaries based at least in part on one or more data points of the plurality of data points. In some implementations, each data region boundary between each pair of data regions is non-orthogonal to an axis of measurement. In some implementations, the instructions when executed are further operable to cause the one or more processors to perform operations including generating a lookup table that maps received data points to data regions based on the data region boundaries. In some implementations, the instructions when executed are further operable to cause the one or more processors to perform operations including assigning each received data point to one of the data regions based on a lookup table, where the lookup table maps received data points to respective data regions based on the data region boundaries.

In some implementations, a method includes receiving a plurality of data points; determining a plurality of data centroids, where each data centroid of the plurality of data centroids is predetermined; generating a plurality of data regions for the plurality of data centroids, where each data region of the plurality of data regions is associated with a respective data centroid of the plurality of data centroids; generating a plurality of data region boundaries for the plurality of data regions based at least in part on one or more data points of the plurality of data points, where each data region boundary of the plurality data region boundaries is associated with a respective data region of the plurality of data regions.

With further regard to the method, in some implementations, the data regions are discrete data regions. In some implementations, the generating of the plurality of data region boundaries is based at least in part on minimal surface theory. In some implementations, to generate the plurality of data region boundaries, the method further includes increasing a size of one or more of the data region boundaries based at least in part on one or more data points of the plurality of data points. In some implementations, each data region boundary between each pair of data regions orthogonal to an axis of measurement. In some implementations, the method further includes generating a lookup table that maps received data points to data regions based on the data region boundaries.

A further understanding of the nature and the advantages of particular implementations disclosed herein may be realized by reference of the remaining portions of the specification and the attached drawings.

BRIEF DESCRIPTION OF THE DRAWINGS

FIG. 9 is a diagram of the integer array of FIG. 5, where the integer array is filled, according to some implementations.

DETAILED DESCRIPTION

Implementations described herein provide an optimal, computationally efficient discretization method for big data analytics. Implementations employ minimal surface theory for data discretization, where minimal surface theory delineates mathematically optimal data region boundaries between a set of discrete data regions.

Implementations improve data velocity, which is the speed at which the system processes data. For example, during runtime, instead of performing a conventional ordered search, the system uses an integer-based lookup array to quickly assign new incoming data points to appropriate data bins, or data regions. This increases the speed by factor of magnitude over conventional solutions.

In various implementations, a system receives data points. The system also determines data centroids, where each data centroid is predetermined. The system then determines data regions for the centroids, where each data region is associated with a respective data centroid. The system then generates data region boundaries based at least in part on one or more of the received data points, where each data region boundary is associated with a respective data region.

Figure 1:
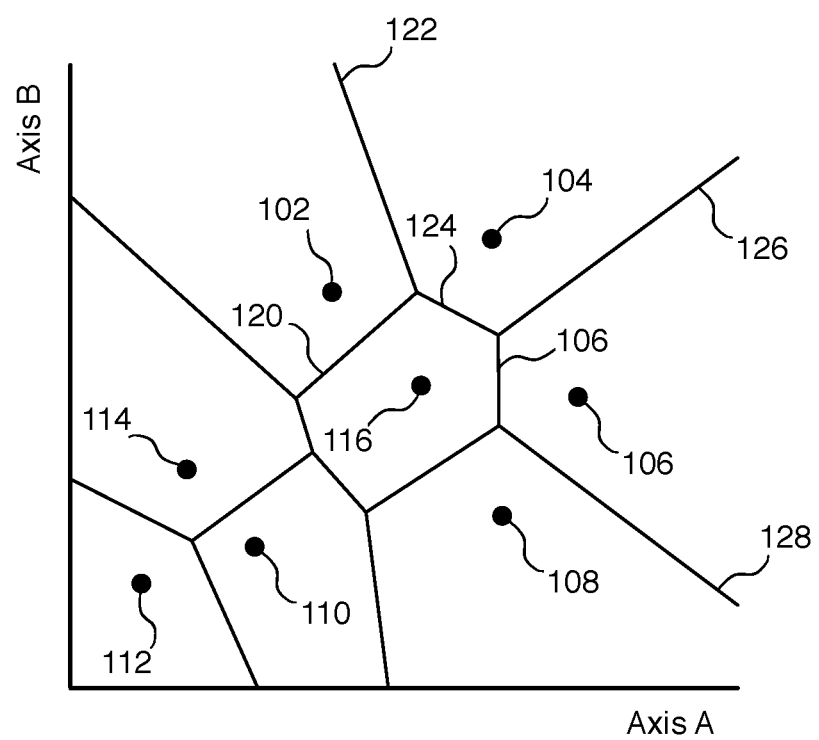
FIG. 1 is a diagram of an example graph that includes data centroids and corresponding data region boundaries, according to some implementations.

FIG. 1 is a diagram of an example graph 100 that includes data centroids and corresponding data region boundaries, according to some implementations. Shown is a set of data points 102, 104, 106, 108, 110, 112, 114, and 116 in two dimensions, where each data point shown represents a data centroid. For ease of illustration, though some implementations are described herein in the context of 2D planes, these implementations and others may also apply to higher dimensions such as a three-axis coordinate system.

Data centroids 102-116 are separate by data region boundaries, such as boundary lines 120, 122, 124,126, and 128. For clarity and ease of illustration, not all boundary lines are shown with reference numbers. As shown, the data region boundaries demarcate discrete data regions. The data region for a given data centroid is indicated by white space surrounding the data centroid and inside the same data region boundary. In various implementations, each data centroid is a representative data point at the center of density in a particular data region. Also, each data centroid represents one or more data point values in a particular data region. The data region boundaries are used to separate a collection of data points, where each data point is assigned to a discrete data region.

In various implementations, the boundary lines of FIG. 1 may be positioned in various positions and angles, unlike conventional solutions where boundaries are orthogonal to the coordinate system axis (e.g., Axis A and Axis B). In other words, the system generates the data region boundaries such that each data region boundary between each pair of data regions will most likely be non-orthogonal to an axis of measurement (e.g., Axis A and Axis B).

As a result, the data region boundaries are optimal at determining which data point on the two-dimensional (2D) plane is closest to a particular data centroid.

For ease of illustration, the data region boundaries shown in FIG. 1 are a finished product. As described in more detail herein, implementations improve the data discretization process through the use of minimal surface theory. In various implementations, minimal surface theory is used as a means of describing the shape of the minimum surface topology that separates a collection of data points. The minimal surface topology represents an optimal boundary representation between the discrete data regions, where each data point is assigned to a discrete data region. The techniques and implementations described herein provide a minimal surface solution to the problem of creating the optimal, discrete data boundaries without resorting to complex mathematics. The only operators needed are "for" loops, "if" statements, and simple integer math. Example implementations directed to building the data region boundaries are described in more detail below.

Implementations may be applied wherever linear search ranges in multiple dimensions need to be gathered into discrete regions. Implementations assign incoming data points to appropriate data bins, or data regions. As described in more detail herein, implementations do not require execution of the complex mathematics usually associated with calculating boundaries for a minimal surface.

Figure 2:
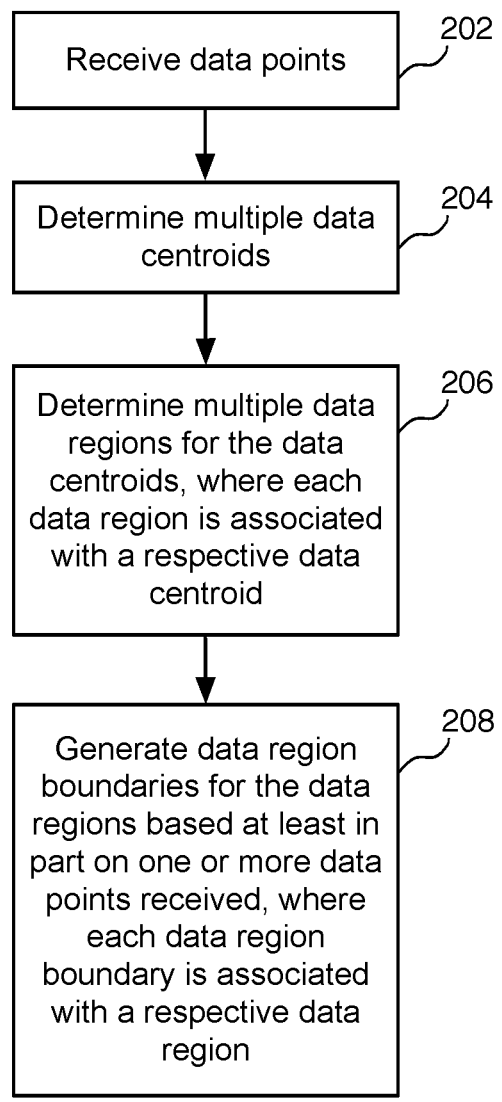
FIG. 2 is an example flow diagram for providing optimal discretization for big data analytics, according to some implementations.

FIG. 2 is an example flow diagram for providing optimal discretization for big data analytics, according to some implementations. Referring to both FIGS. 1 and 2, a method is initiated at block 202, where the system receives data points.

At block 204, the system determines multiple data centroids of a set of data points. For example, the system may determine the locations of data centroids 102-116. In various implementations, each data centroid is predetermined. For example, the data centroids 102 to 116 may be calculated by the system or by another system in advance of this block. Further, data centroids may be calculated using any one or more suitable techniques for calculating data centroids.

At block 206, the system determines multiple data regions for the data centroids, where each data region is associated with a respective data centroid. In various implementations, each data region includes a set of one or more data points, including a representative data centroid at the center of density in the data region.

At block 208, the system generates data region boundaries for the data regions based at least in part on one or more data points received, where each data region boundary is associated with a respective data region. In various implementations, the data regions are discrete data regions. As indicated above, the data region boundaries demarcate the discrete data regions. Implementations directed to building the data region boundaries are described in more detail below.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
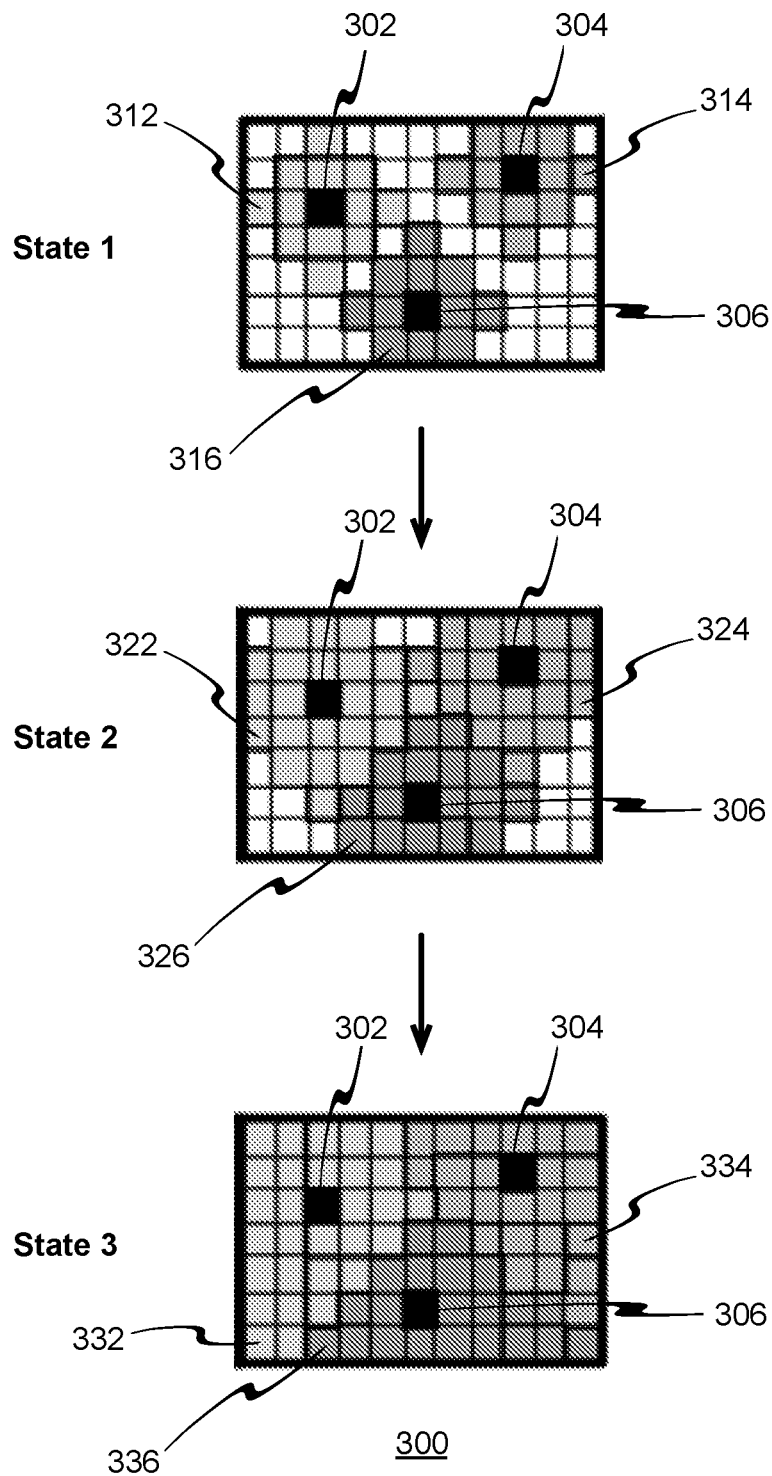
FIG. 3 is a diagram of an example progression of an expanding integer array of data points, according to some implementations.

FIG. 3 is a diagram of an example progression 300 of an expanding integer array of data points, according to some implementations. In various implementations, the system generates discrete data region boundaries based at least in part on minimal surface theory for data discretization. As described in more detail herein, the system applies minimal surface theory to provide discrete data region boundaries between expanding data regions. Note that the terms integer array, integer data array, integer data space, and data space may be used interchangeably. The process of expanding the spheres or data regions is performed in an integer data space or array that is defined as a region of data point values. Note that the terms spheres and data regions may be used interchangeably.

In the following implementations, the system expands multiple data regions in an integer array based at least in part on minimal surface theory for data discretization. As described in more detail herein, the system applies minimal surface theory to provide discrete data region boundaries between a set of discrete data regions.

Shown are expanding data centroids 302, 304, and 306 (also indicated by black squares in the integer array) in three states, labeled State 1, State 2, and State 3. The system expands the data regions about their respective data centroids in order to generate data region boundaries.

Referring to State 1, the data regions are indicated with darkened squares. For example, the data region that includes data centroid 302, data point 312, as well as the other contiguous data points indicated by the same shade of darkened squares. In this example, the data region containing data centroid 302 includes 13 data points (squares), where the outermost data points constitute the data region boundary.

In various implementations, the darkened squares shown in the integer data array represent discrete data point locations in the data regions. Note that the terms discrete data point locations, discrete data locations, discrete locations, data locations, and locations may be used interchangeably.

Another data region includes data centroid 304, data point 314, as well as the other contiguous data points indicated by the same shade of darkened squares. In this example, the data region containing data centroid 304 also includes 13 data points (squares), where the outermost locations constitute the data region boundary.

Yet another data region includes data centroid 306, data point 316, as well as the other contiguous data points indicated by the same shade of darkened squares. In this example, the data region containing data centroid 304 also includes 13 data points (squares), where the outermost locations constitute the data region boundary.

In various implementations, to generate the data region boundaries, the system increases or expands the size of each of the data region boundaries based at least in part on one or more data points. The expansion process occurs as the system receives incoming data points and assigns the data points to discrete data locations in a data region. The system expands a given data region by adding incoming data points to empty data locations adjacent to existing (filled) locations of the given data region. This grows a unit-value-thick layer around each data region, thereby expanding the data region. The system repeats the process until all of the locations within the data space have been used/filled, which is described in more detail below in connection with States 2 and 3.

Referring to State 2, the system has expanded each of the data regions by one layer of discrete locations compared to State 1. For example, the data region that includes data centroid 302 has additional data points, such as data point 322. As shown, the data region containing data centroid 302 has been expanded to include 23 data points (squares), where the outermost data points constitute the expanded data region boundary.

Similarly, the data region that includes data centroid 304 has additional data points, such as data point 324, for example. As shown, the data region containing data centroid 304 has been expanded to include 20 data points (squares), where the outermost data points constitute the expanded data region boundary.

Further, the data region that includes data centroid 306 has additional data points, such as data point 326, for example. As shown, the data region containing data centroid 306 has been expanded to include 17 data points (squares), where the outermost data points constitute the expanded data region boundary.

In various implementations, as each data region expands, the system marks each discrete location in the data region with the value assigned to that data region if that discrete location is still unclaimed. In various implementations, an un-assigned value is typically zero "0" with the data region numbering or assigned values starting at "1". Each assigned value is also an index of a lookup table, where the index assigned to that data region is stored. In other words, each assigned value represents the region number to which the corresponding discrete location is assigned, where the region number indicates what processing is to be done on that data. Example implementations directed to such a lookup table are described in more detail below.

In various implementations, each position/discrete data location position is marked only once. Once a location has been assigned, it cannot be over-written. The system grows a data region around each data centroid through any suitable initial data point discretization process. A single layer or continuous series of adjacent data point locations is added to all of the expanding spheres. As a result, the radius of each data region becomes incrementally larger than the radius in the preceding iteration.

As the incrementally enlarge the data regions, they begin to intersect. The intersection of the data regions form planes between the data regions. The planes divide the discrete locations of the data regions such that each discrete location within a given data region is associated with the data centroid also contained the given data region.

In various implementations, the system repeats this process of marking the discrete data locations until all of the locations within the integer data array have been filled or claimed with index values (and have an associated data centroid).

Referring to State 3, the system has further expanded each of the data regions. For example, the data region that includes data centroid 302 has additional data points, such as data point 332, for example. As shown, the data region containing data centroid 302 has been expanded to include 30 data points (squares), where the outermost data points constitute the expanded data region boundary.

Similarly, the data region that includes data centroid 304 has additional data points, such as data point 334, for example. As shown, the data region containing data centroid 304 has been expanded to include 25 data points (squares), where the outermost data points constitute the expanded data region boundary.

Further, the data region that includes data centroid 306 has additional data points, such as data point 336, for example. As shown, the data region containing data centroid 306 has been expanded to include 22 data points (squares), where the outermost data points constitute the expanded data region boundary.

As shown, in various implementations, the system expands the data regions at the same rate. Also the data centroids remain fixed centers. As the expanding data regions expand and meet, they automatically form a topologically optimal surface that defines a data region boundary for each data region. As a result of the data region expansion process, the system has generated an optimal data region boundary representation for the set of data centroids in the data.

The boundary delineation between the data centers also operate on 3D data and automatically forms a description of the topologically minimal surface. This natural boundary delineation removes the need to use calculus to determine the needed surface topology. In other words, implementations avoid complex mathematics that often accompanies the use of minimal surface theory and mathematical topology in general. As indicated herein, implementations may apply to 2D planes, 3D volumes or 4D spaces. For example, for a 4D case, suppose the $4^{th}$ dimension is time as in months of the year. There would be twelve 3D arrays, one for each month of the year. This could, for example, be used for using a person's month of birth as a discretization element. Using configurations at 5D or above might be possible but they become problematic with the size of the LUT if the LUT dimensions are not trivial.

In various implementations, the process of creating the regions based on minimal surface theory is a process for generating a lookup table (LUT) for received incoming data points during runtime. In various implementations, the final state of the integer data array (completely filled) may be used as the lookup table (LUT). By building and populating the integer data array, the system in effect generates a lookup table that maps received data points to data regions based on the data region boundaries. In various implementations, the LUT may be defined as an array of discrete data point locations allocated to different respective data regions.

In most implementations, a data structure called a "multidimensional array" may be used. In the example implementations associated with FIGS. 1 and 4, a two-dimensional integer array is used. Each element of the integer array is a discrete value. Hence, the regions generated will also be discrete. Once the process of assigning regions within the array is complete, the same array is then used as the lookup table. In various implementations, the incoming data may be scaled to the array as integer values depending on the situation and the type of the source data. This conversion to integer ranges may also apply to the process of determining data centroids.

In various implementations, each data centroid is contained in and associated with a particular data region in the LUT. As indicated above, a data centroid is the center of density for the data point values within a given data region. In various implementations, data centroid is used as a representative data value in the LUT for that data region. This representative data value represents all of the data points in that particular data region. The representative data value (data centroid value) may be referred to as the LUT index value (positive integer value) for a given data region, where each data region is associated with a respective LUT index value of a corresponding data centroid.

In various implementations, each data region contains and is associated with discrete data point locations in the LUT. In some implementations, each data point location specifies an individual data point by referencing a data centroid. A data point value referencing a LUT index value is assigned the data region stored there in association with the entry. As a result, the LUT provides a direct mapping of received data points to data regions.

During runtime, in various implementations, the system assigns each received data point to one of the data regions based on the LUT, where the LUT maps received data points to respective data regions based on the data region boundaries.

Figure 4:
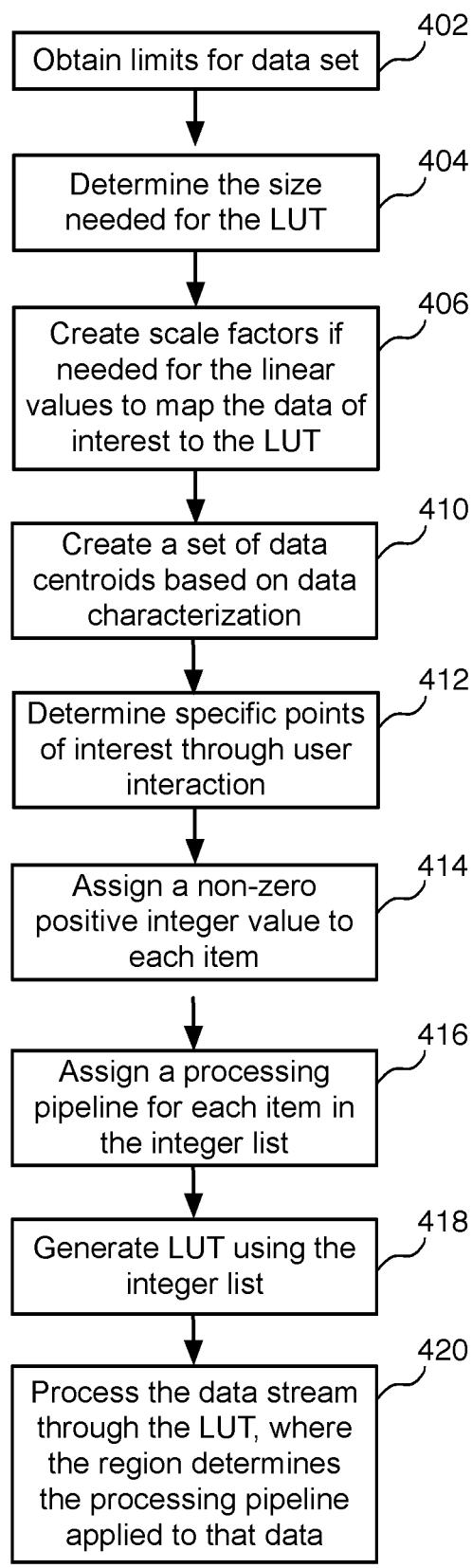
FIG. 4 is another example flow diagram for providing optimal discretization for big data analytics, according to some implementations.

FIG. 4 is another example flow diagram for providing optimal discretization for big data analytics, according to some implementations. FIG. 4 describes various aspects directed to the LUT. In various implementations, a method is initiated at block 402, where the system obtains limits for a data set. In various implementations, the limits may be data parameters. For example, a data set may include information about people, where each person has various attributes (e.g., age, distance from a city center, education, income, marital status, group affiliations, etc.).

At block 404, the system determines the size needed for the LUT. For example, the system may determine the dimensions for the LUT.

At block 406, the system creates scale factors if needed for the linear values to map the data of interest to the LUT.

In some implementations, the system determines a selection method for selecting data centroids.

At block 410, the system creates a set of data centroids based on data characterization. For example, in some implementations, the system may use data density mapping to determine the location of each data centroid. The particular technique may vary, depending on the particular implementation. For example, the system may use a histogram, calculus equations, etc., to determine data centroid locations.

At block 412, the system determines specific points of interest through user interaction. In some implementations, the system may automatically, without user intervention, determine the data centroids. In some implementations, the system may receive input from a user.

Figure 5:
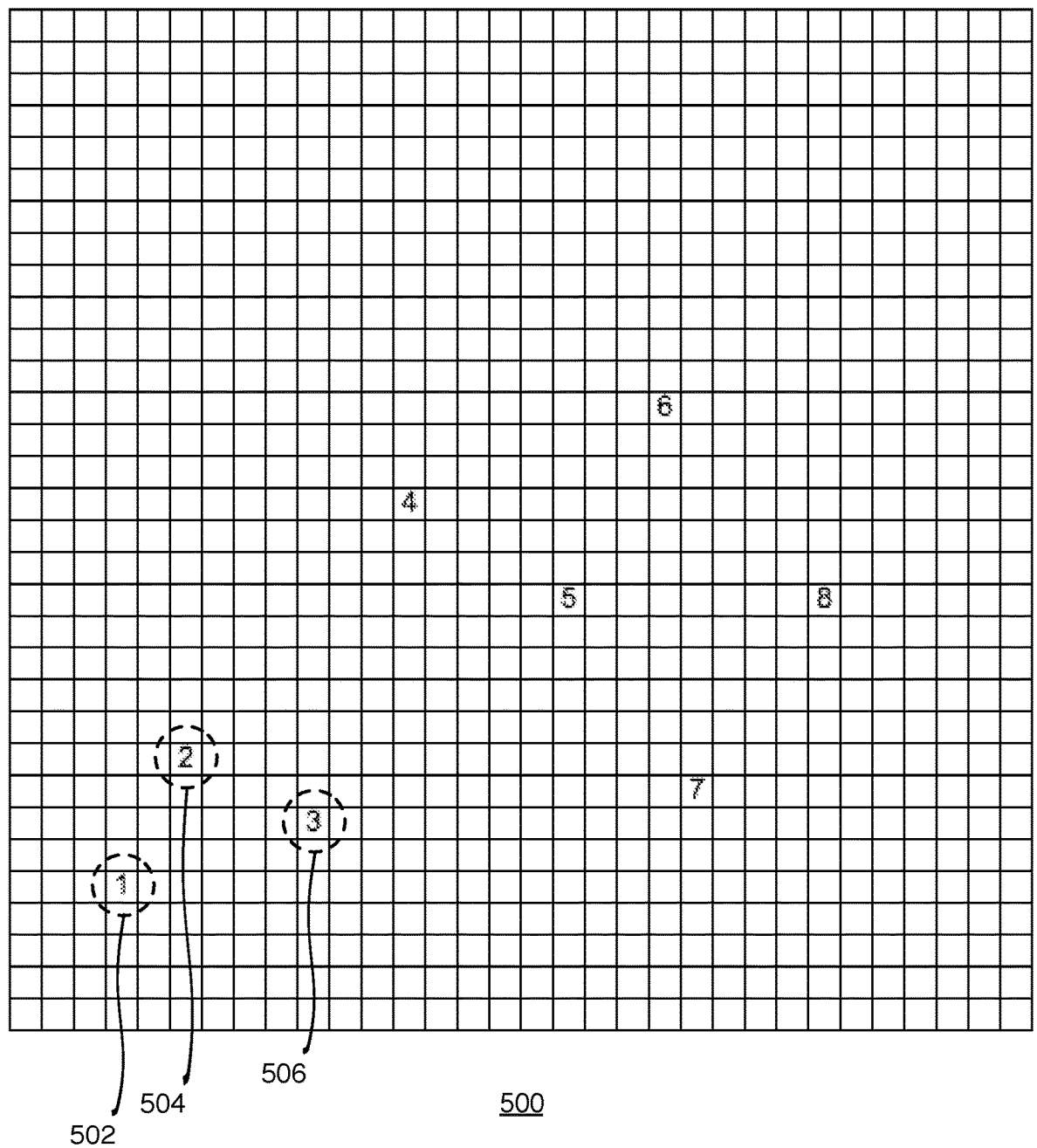
FIG. 5 is a diagram of an example integer array, including data centroids, according to some implementations.

At block 414, the system assigns a non-zero positive integer value to each item, each data centroid. In various implementations, the system may initially set all locations of an array to zero, where a zero in a given array location indicates an unassigned array location, and a non-zero integer indicates an assigned array location. FIG. 5 shows an example integer array with non-zero positive integers assigned to data centroids.

Referring still to FIG. 4, at block 416, the system assigns a processing pipeline for each item in the integer list. In various implementations, the system assigns different pipelines to different data regions. As indicated, each array location of a given data region has the same integer value. As such, any received data that falls within the given data region is assigned the same integer value.

At block 418, the system generates the LUT using the integer list.

At block 420, the system processes the data stream through the LUT, where the region determines the processing pipeline applied to that data. As indicated above, the system assigns different pipelines to different data regions, and any received data that falls within the given data region is assigned the same integer value. As such, all data within the given data region are processed similarly in the same data pipeline.

In various implementations, different search parameters may be applied to different data regions. For example, the system may search for different types of data (e.g., location, income, etc.) associated with a particular category or data set (e.g., people under 30 years old). As the system receives data, the system may associate the data set with a particular data region. As such, data associated with people who are under 30 years would also be associated with the same data region and processed together and in the same manner. Because people who are 30 years and older are associated with other data regions, this particular search ignores data associated with those persons, which saves computation time and resources.

FIG. 5 is a diagram of an example integer array 500, including data centroids, according to some implementations. As shown, various array locations are assigned integers. For example, an integer "1" is assigned to array location 502, an integer "2" is assigned to array location 504, an integer "3" is assigned to array location 506, etc. For ease of illustration, 8 data centroids are shown. The particular number of data centroids may vary, depending on the particular implementation.

FIGS. 6 through 10 are diagrams showing an example progression integer array 500 expanding. Similar to the progression of FIG. 3, in various implementations, the system generates discrete data region boundaries between expanding data regions based at least in part on minimal surface theory for data discretization.

Figure 6:
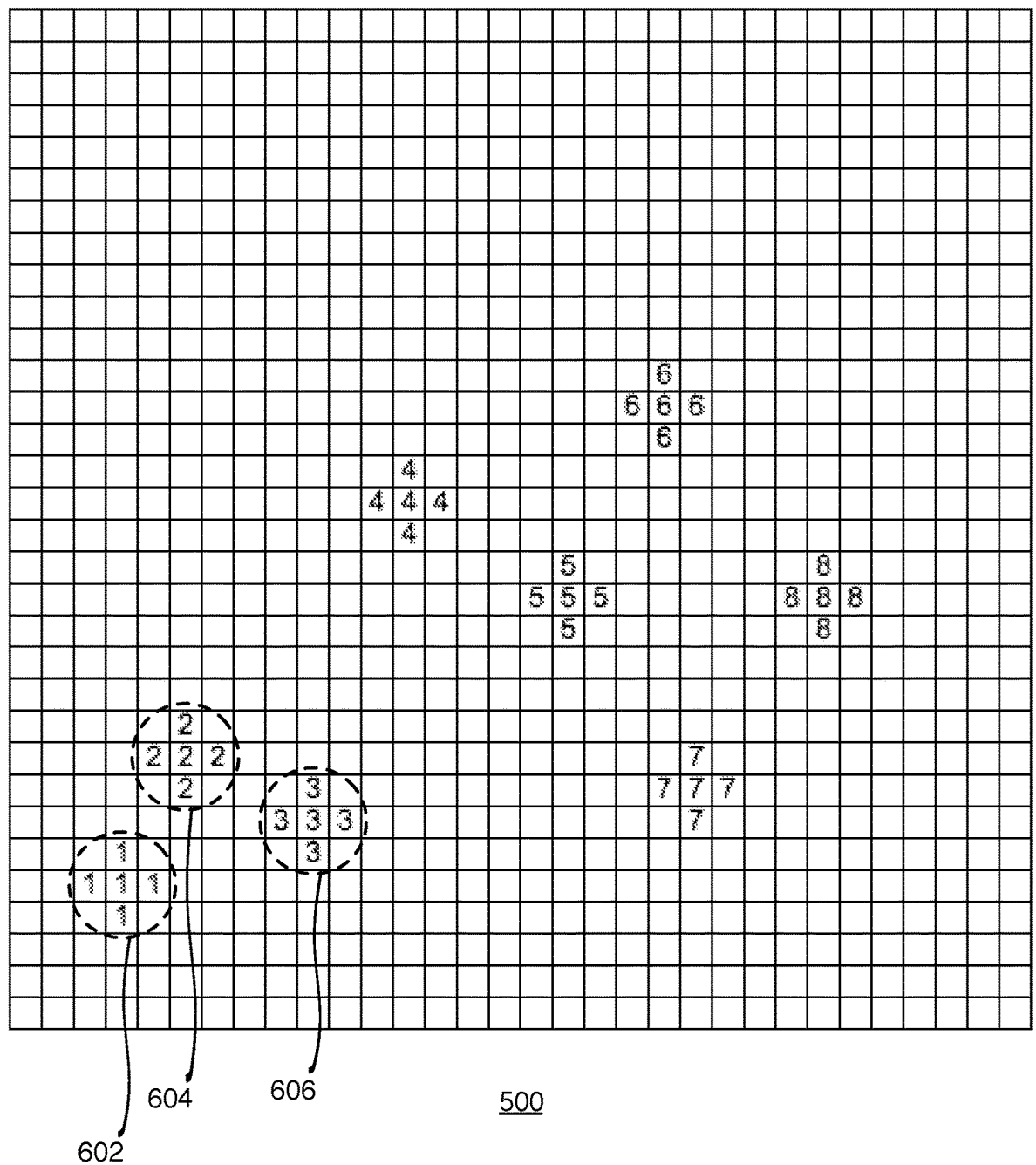
FIG. 6 is a diagram of the integer array of FIG. 5, where the integer array is expanding, according to some implementations.

FIG. 6 is a diagram of integer array 500 of FIG. 5, where integer array 500 is expanding, according to some implementations. As shown, the system has expanded a data region 602 by assigning additional data points (e.g., integer values) to the surrounding array locations. As shown, the system has assigned the same integer (e.g., "1") to the surrounding array locations.

The outermost data points constitute the expanded data region boundary. Similarly, the system has expanded a data region 604 by assigning additional integer values to the surrounding array locations. As shown, the system has assigned the same integer (e.g., "2") to the surrounding array locations.

The system has also expanded a data region 606 by assigning additional integer values to the surrounding array locations, etc. As shown, the system has expanded the other data regions in a similar manner. As shown, the system has assigned the same integer (e.g., "3") to the surrounding array locations.

Figure 7:
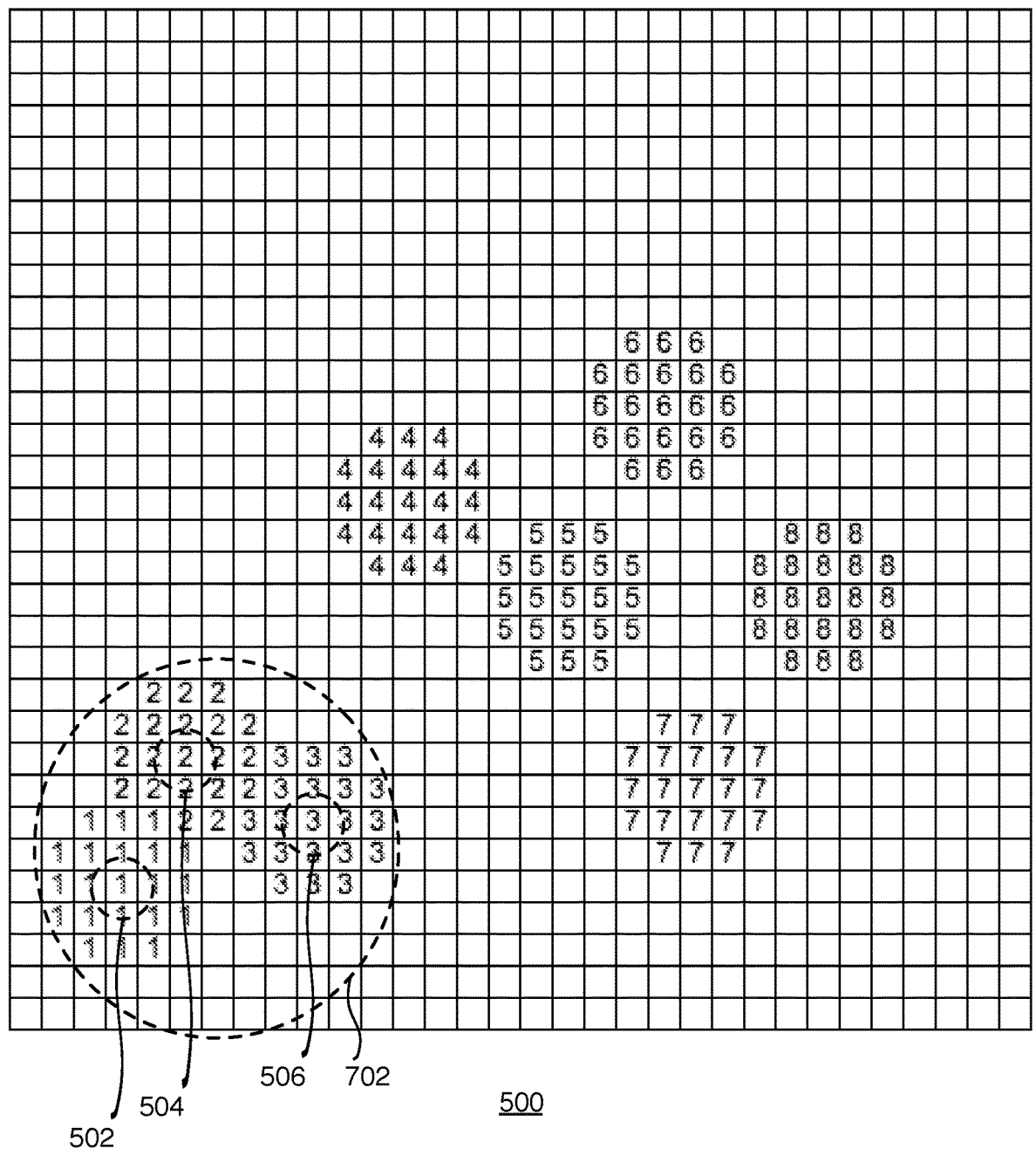
FIG. 7 is a diagram of the integer array of FIG. 5, where data regions are expanding into other data regions, according to some implementations.

FIG. 7 is a diagram of integer array 500 of FIG. 5, where data regions are expanding into other data regions, according to some implementations. As shown, a portion 702 of integer array 500 shows some data regions expanding into other data regions, which further defines the data region boundaries. For example, the array locations between data centroid 502 and data centroid 504 are filling such that a natural data region boundary is established between the two data centroids 502 and 504. That data region boundary is indicated by the difference in integer values (e.g., "1" and "2").

Also, as shown, the data region boundary is formed such that data centroid 502 and data centroid 504 are equidistant to the data region boundary between them. In other words, the data region boundary is halfway between data centroids 502 and 504. Similarly, a data region boundary is formed such that data centroid 504 and data centroid 504 are equidistant to the data region boundary distance relationship between.

Figure 8:
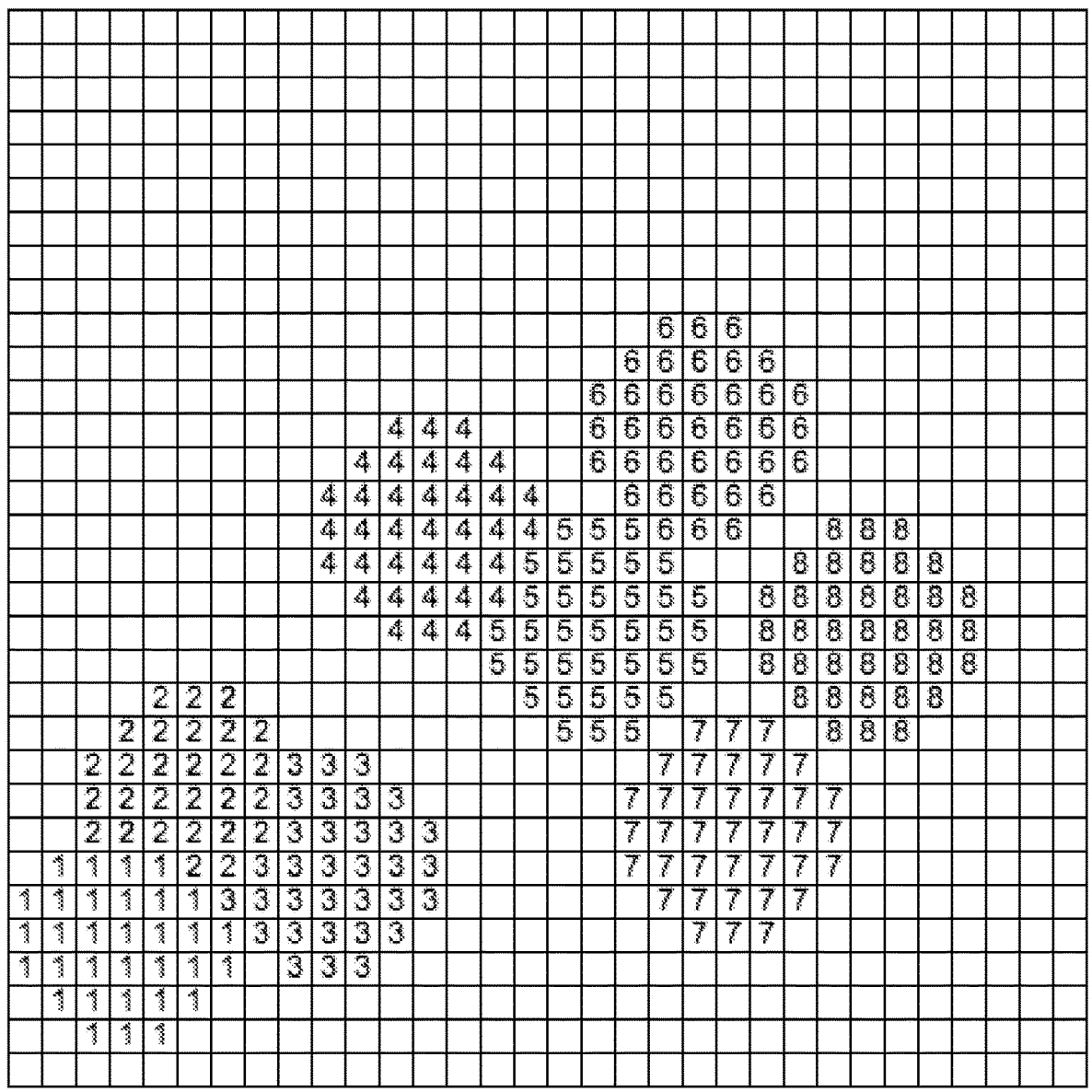
FIG. 8 is a diagram of the integer array of FIG. 5, where more data regions are expanding into other data regions, according to some implementations.

FIG. 8 is a diagram of integer array 500 of FIG. 5, where more data regions are expanding into other data regions, according to some implementations. As shown, the system forms data region boundaries such that the data centroids are equidistant to their shared data region boundaries.

Figure 9:
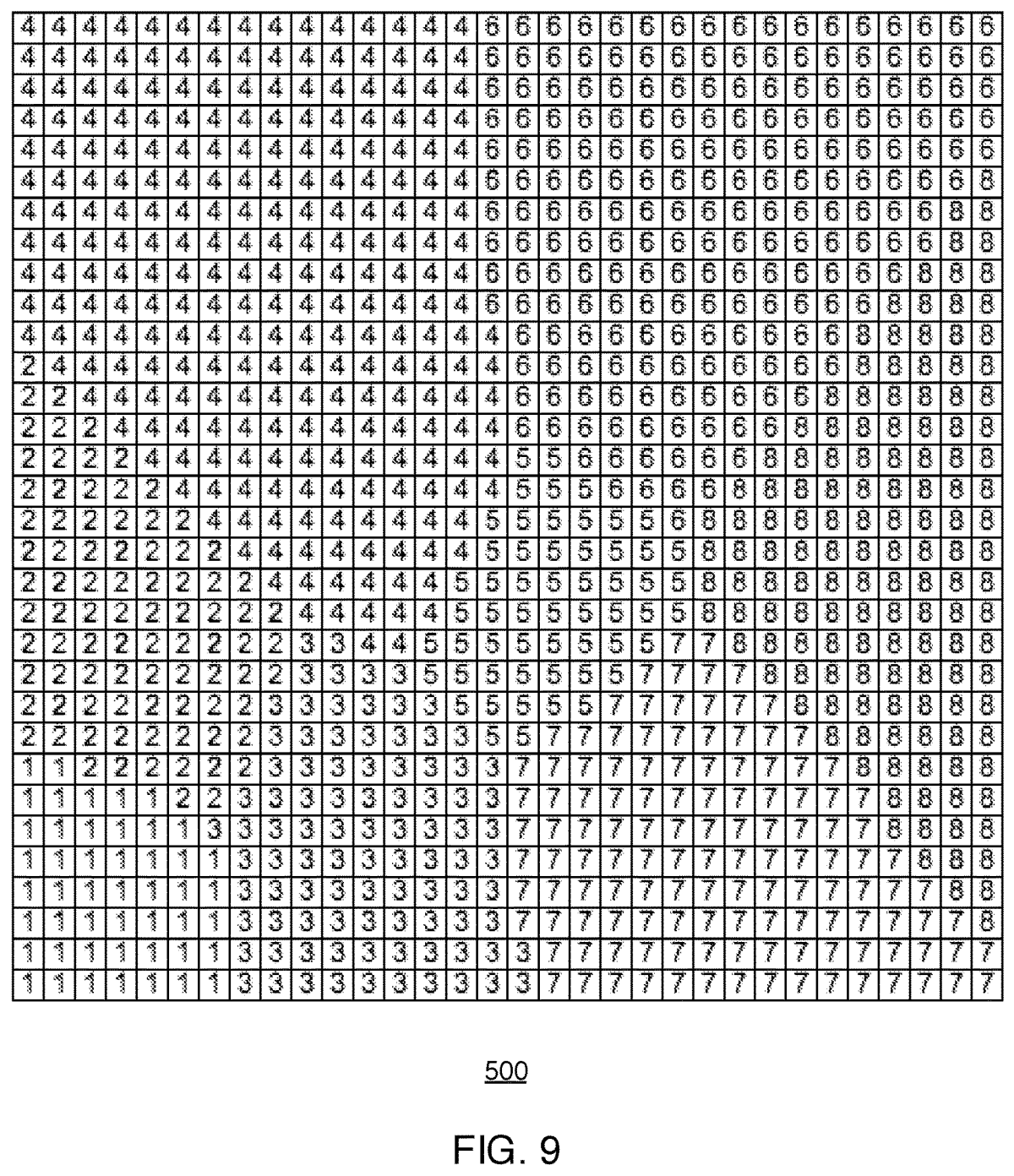

FIG. 9 is a diagram of integer array 500 of FIG. 5, where integer array 500 is filled, according to some implementations. In various implementations, integer array 500 includes the LUT needed for operation of implementations described herein.

Figure 10:
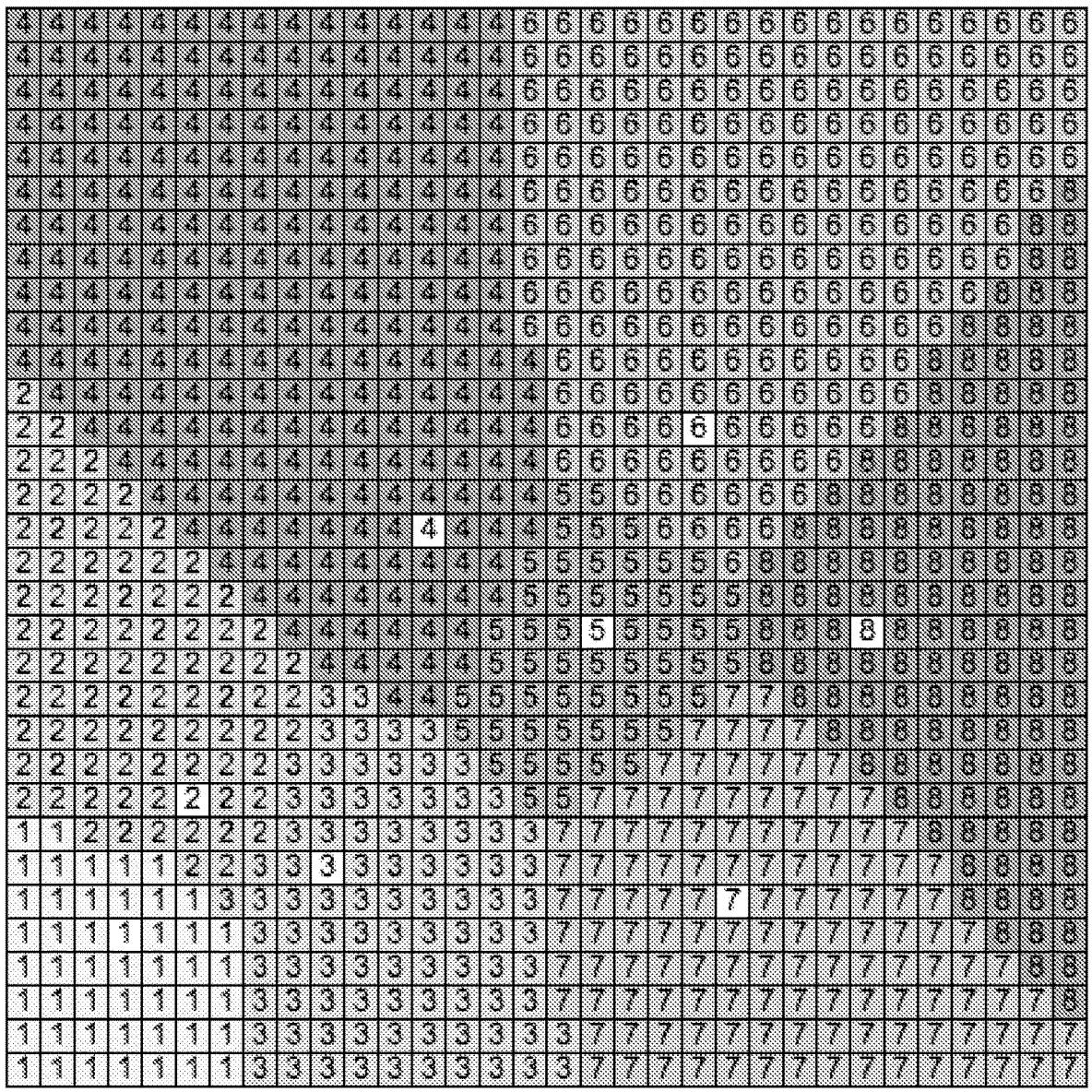
FIG. 10 is a diagram of the integer array of FIG. 5, where the integer array is filled and data region boundaries are shown in different shades for ease of illustration.

FIG. 10 is a diagram of integer array 500 of FIG. 5, where integer array 500 is filled and data region boundaries are shown in different shades. For ease of illustration, different data regions are shaded differently such that they are easier to discern and more clearly show data region boundaries between data regions. Also, for ease of illustration, the data centroids are shown as white squares. As shown, the system creates similar distance relationships between each pair of data centroids and their shared data region boundary.

As indicated above, in various implementations, the system may generate data region boundaries such that each data region boundary between each pair of data regions is non-orthogonal to an axis of measurement (e.g., Axis A and Axis B), as shown in FIG. 10. Alternatively, in other implementations, the system may also generate data region boundaries such that each data region boundary between each pair of data regions is non-orthogonal to an axis of measurement, as shown below in FIG. 11.

Figure 11:
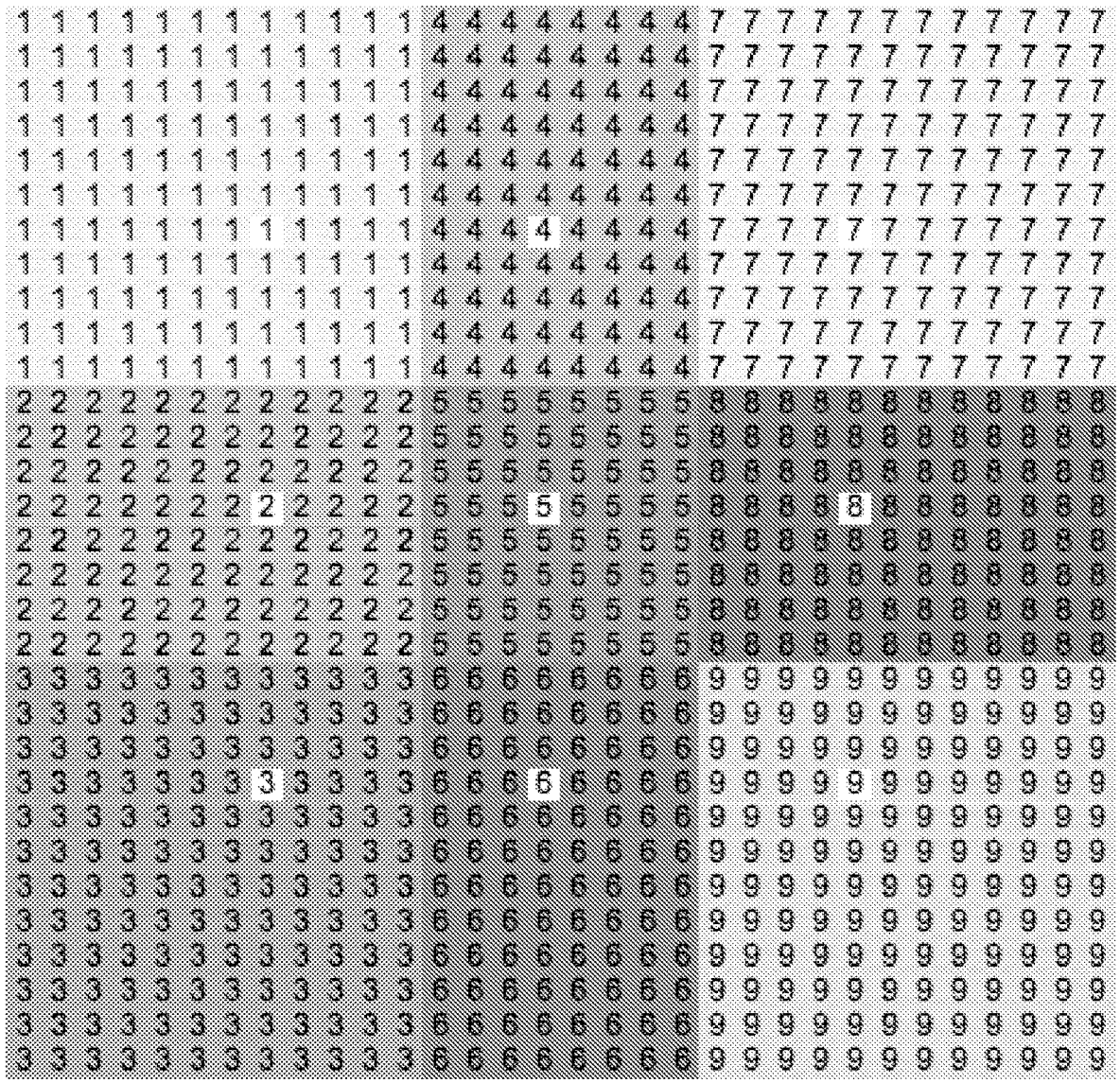
FIG. 11 is a diagram of another example integer array, where integer array is filled and data region boundaries are shown in different shades.

FIG. 11 is a diagram of another example integer array 1100, where integer array 1100 is filled and data region boundaries are shown in different shades, and where in this example, the data region boundary between each pair of data regions is orthogonal to an axis of measurement. Similar to FIG. 10, for ease of illustration, different data regions are shaded differently such that they are easier to discern and more clearly show data region boundaries between data regions. Also, for ease of illustration, the data centroids are shown as white squares. As shown, the system creates similar distance relationships between each pair of data centroids and their shared data region boundary.

Note that with conventional techniques, data region boundaries are hard wired must be aligned to an axis. In contrast, implementations described herein are not required to be aligned to an axis. While the system may generate data region boundaries that are not required to be aligned to an axis, the system may also generate data region boundaries that are aligned to an axis. In various implementations, whether or not the system creates data region boundaries that are aligned or not aligned to an axis is determined by the initial placement of the centroids.

Implementations described herein provide various benefits. For example, implementations eliminate restrictions of conventional solutions, and produce far more accurate results for the discretization process. Implementations also improve data velocity. Implementations described herein also eliminate the restriction of having boundaries for the discretization process always be orthogonal to the axis of measurement.

FIG. 11 is a block diagram of an example network environment, which may be used for implementations described herein. In some implementations, network environment 1100 includes a system 1102, which includes a server device 1104 and a database 1106. Network environment 1100 also includes client devices 1110, 1120, 1130, and 1140, which may communicate with system 1102 and/or may communicate with each other directly or via system 1102. Network environment 1100 also includes a network 1150 through which system 1102 and client devices 1110, 1120, 1130, and 1140 communicate. Network 1150 may be any suitable communication network such as a Wi-Fi network, Bluetooth network, the Internet, etc.

For ease of illustration, FIG. 11 shows one block for each of system 1102, server device 1104, and network database 1106, and shows four blocks for client devices 1110, 1120, 1130, and 1140. Blocks 1102, 1104, and 1106 may represent multiple systems, server devices, and databases. Also, there may be any number of client devices. In other implementations, network environment 1100 may not have all of the components shown and/or may have other elements including other types of elements instead of, or in addition to, those shown herein.

While server 1104 of system 1102 performs embodiments described herein, in other embodiments, any suitable component or combination of components associated with server 1104 or any suitable processor or processors associated with server 1104 may facilitate performing the embodiments described herein.

Implementations may apply to any network system and/or may apply locally for an individual user. System 1102 may perform the implementations described herein on a standalone computer, tablet computer, smartphone, etc. System 1102 may perform implementations described herein individually or in combination with other devices. In the various implementations described herein, a processor of system 1102 may cause the elements described herein (e.g., information, data points, integer arrays, etc.) to be displayed in a user interface on one or more display screens.

Figure 12:
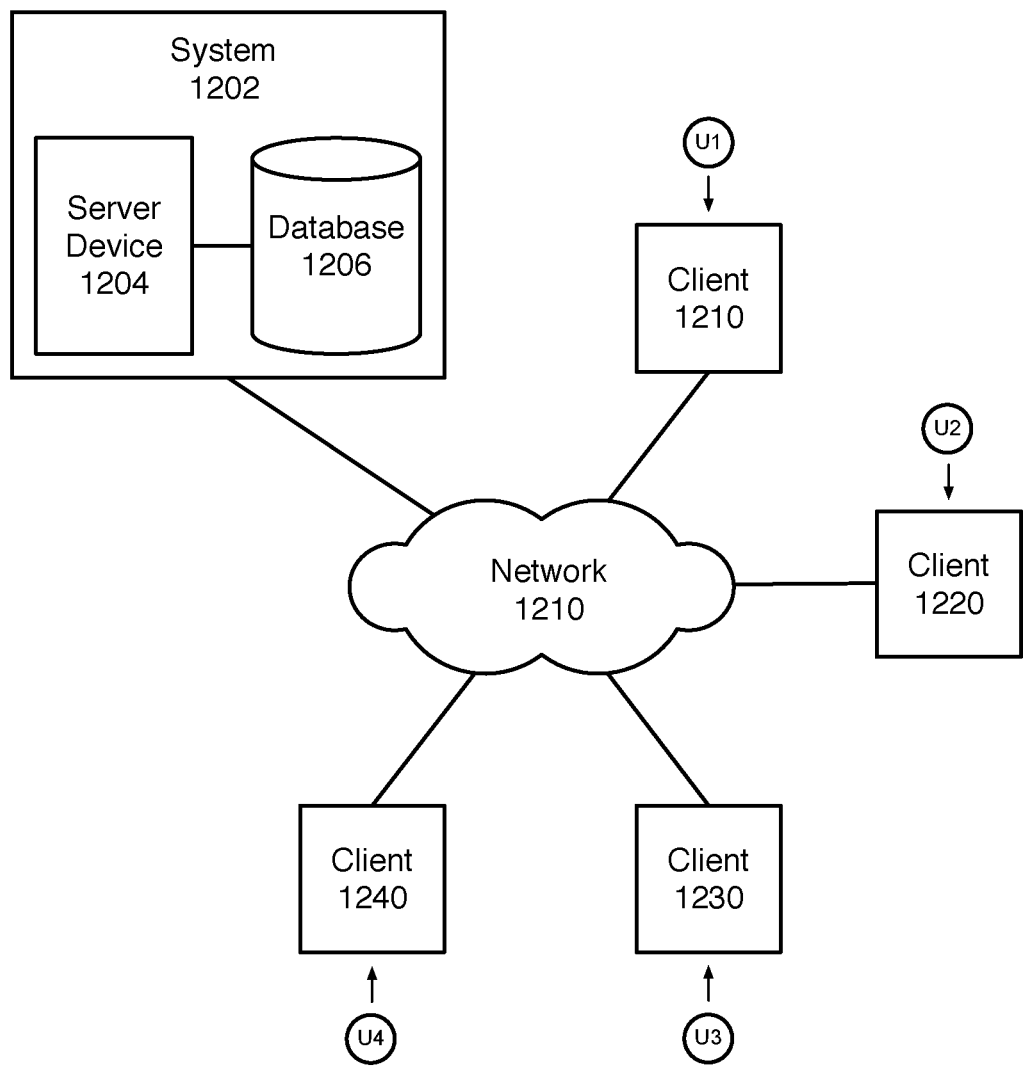
FIG. 12 is a block diagram of an example network environment, which may be used for some implementations described herein.
Figure 13:
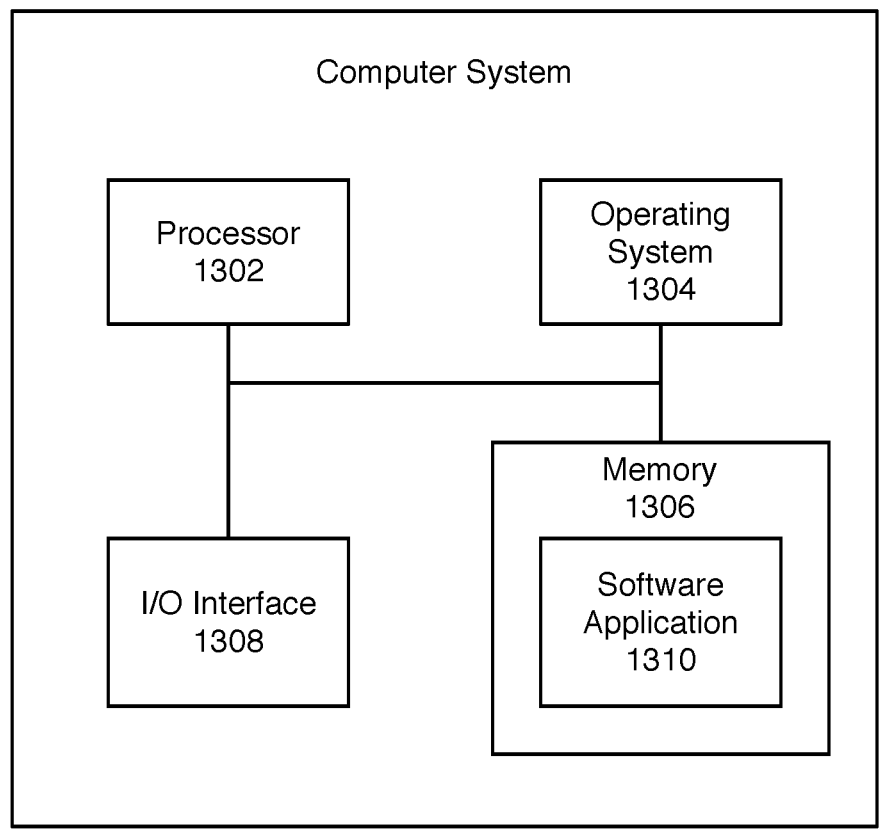
FIG. 13 is a block diagram of an example computer system, which may be used for some implementations described herein.

FIG. 12 is a block diagram of an example computer system 1200, which may be used for some implementations described herein. For example, computer system 1200 may be used to implement server device 1104 of FIG. 11, as well as to perform implementations described herein. In some implementations, computer system 1200 may include a processor 1202, an operating system 1204, a memory 1206, and an input/output (I/O) interface 1208. In various implementations, processor 1202 may be used to implement various functions and features described herein, as well as to perform the method implementations described herein. While processor 1202 is described as performing implementations described herein, any suitable component or combination of components of computer system 1200 or any suitable processor or processors associated with computer system 1200 or any suitable system may perform the steps described. Implementations described herein may be carried out on a user device, on a server, or a combination of both.

Computer system 1200 also includes a software application 1210, which may be stored on memory 1206 or on any other suitable storage location or computer-readable medium. Software application 1210 provides instructions that enable processor 1202 to perform the implementations described herein and other functions. Software application may also include an engine such as a network engine for performing various functions associated with one or more networks and network communications. The components of computer system 1200 may be implemented by one or more processors or any combination of hardware devices, as well as any combination of hardware, software, firmware, etc.

For ease of illustration, FIG. 12 shows one block for each of processor 1202, operating system 1204, memory 1206, I/O interface 1208, and software application 1210. These blocks 1202, 1204, 1206, 1208, and 1210 may represent multiple processors, operating systems, memories, I/O interfaces, and software applications. In various implementations, computer system 1200 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   receiving a plurality of data points;
   determining a plurality of data centroids;
   determining a plurality of data regions for the plurality of data centroids, wherein each data region of the plurality of data regions is associated with a respective data centroid of the plurality of data centroids;
   generating a plurality of data region boundaries in a data space for the plurality of data regions based at least in part on one or more data points of the plurality of data points, wherein each data region boundary of the plurality data region boundaries is associated with a respective data region of the plurality of data regions;
   identifying unclaimed data locations of the plurality of data regions in the data space that are unclaimed by data centroid values associated with assigned to their respective data region;
   marking the unclaimed data locations with an unassigned value; and
   increasing a size of each of the data region boundaries by changing unassigned values of the unclaimed data locations to data centroid values corresponding to respective data centroids until a predetermined amount of locations within the data space is filled with data points.

2. The system of claim 1, wherein the data regions are discrete data regions.

3. The system of claim 1, wherein the generating of the plurality of data region boundaries is based at least in part on minimal surface theory.

4. The system of claim 1, wherein, to generate the plurality of data region boundaries, the logic when executed is further operable to cause the one or more processors to perform operations comprising increasing a size of one or more of the data region boundaries based at least in part on one or more data points of the plurality of data points.

5. The system of claim 1, wherein each data region boundary between each pair of data regions is non-orthogonal to an axis of measurement.

6. The system of claim 1, wherein the logic when executed is further operable to cause the one or more processors to perform operations comprising generating a lookup table that maps received data points to data regions based on the data region boundaries.

7. The system of claim 1, wherein the logic when executed is further operable to cause the one or more processors to perform operations comprising assigning each received data point to one of the data regions based on a lookup table, wherein the lookup table maps received data points to respective data regions based on the data region boundaries.

8. A non-transitory computer-readable storage medium with program instructions stored thereon, the program instructions when executed by one or more processors are operable to cause the one or more processors to perform operations comprising:
   receiving a plurality of data points;
   determining a plurality of data centroids;
   determining a plurality of data regions for the plurality of data centroids, wherein each data region of the plurality of data regions is associated with a respective data centroid of the plurality of data centroids;
   generating a plurality of data region boundaries in a data space for the plurality of data regions based at least in part on one or more data points of the plurality of data points, wherein each data region boundary of the plurality data region boundaries is associated with a respective data region of the plurality of data regions; and
   identifying unclaimed data locations of the plurality of data regions in the data space that are unclaimed by data centroid values associated with assigned to their respective data region;
   marking the unclaimed data locations with an unassigned value; and
   increasing a size of each of the data region boundaries by changing unassigned values of the unclaimed data locations to data centroid values corresponding to respective data centroids until a predetermined amount of locations within the data space is filled with data points.

9. The computer-readable storage medium of claim 8, wherein the data regions are discrete data regions.

10. The computer-readable storage medium of claim 8, wherein the generating of the plurality of data region boundaries is based at least in part on minimal surface theory.

11. The computer-readable storage medium of claim 8, wherein, to generate the plurality of data region boundaries, the instructions when executed are further operable to cause the one or more processors to perform operations comprising increasing a size of one or more of the data region boundaries based at least in part on one or more data points of the plurality of data points.

12. The computer-readable storage medium of claim 8, wherein each data region boundary between each pair of data regions is non-orthogonal to an axis of measurement.

13. The computer-readable storage medium of claim 8, wherein the instructions when executed are further operable to cause the one or more processors to perform operations comprising generating a lookup table that maps received data points to data regions based on the data region boundaries.

14. The computer-readable storage medium of claim 8, logic when executed is further operable to cause the one or more processors to perform operations comprising assigning each received data point to one of the data regions based on a lookup table, wherein the lookup table maps received data points to respective data regions based on the data region boundaries.

15. A computer-implemented method comprising:
receiving a plurality of data points;
determining a plurality of data centroids
determining a plurality of data regions for the plurality of data centroids, wherein each data region of the plurality of data regions is associated with a respective data centroid of the plurality of data centroids;
generating a plurality of data region boundaries in a data space for the plurality of data regions based at least in part on one or more data points of the plurality of data points, wherein each data region boundary of the plurality data region boundaries is associated with a respective data region of the plurality of data regions; and
identifying unclaimed data locations of the plurality of data regions in the data space that are unclaimed by data centroid values associated with assigned to their respective data region;
marking the unclaimed data locations with an unassigned value; and
increasing a size of each of the data region boundaries by changing unassigned values of the unclaimed data locations to data centroid values corresponding to respective data centroids until a predetermined amount of locations within the data space is filled with data points.

16. The method of claim 15, wherein the data regions are discrete data regions.

17. The method of claim 15, wherein the generating of the plurality of data region boundaries is based at least in part on minimal surface theory.

18. The method of claim 15, wherein, to generate the plurality of data region boundaries, the method further comprises increasing a size of one or more of the data region boundaries based at least in part on one or more data points of the plurality of data points.

19. The method of claim 15, wherein each data region boundary between each pair of data regions is non-orthogonal to an axis of measurement.

20. The method of claim 15, further comprising generating a lookup table that maps received data points to data regions based on the data region boundaries.

* * * * *